United States Patent
Reed (10) Patent No.: US 9,462,662 B1
(45) Date of Patent: Oct. 4, 2016

(54) LOW POWER PHOTOCONTROL FOR LUMINAIRE

(71) Applicant: Express Imaging Systems, LLC, Renton, WA (US)

(72) Inventor: William G. Reed, Seattle, WA (US)

(73) Assignee: EXPRESS IMAGING SYSTEMS, LLC, Renton, WA (US)

( * ) Notice: Subject to any disclaimer, the term of this patent is extended or adjusted under 35 U.S.C. 154(b) by 0 days.

(21) Appl. No.: 14/994,569

(22) Filed: Jan. 13, 2016

Related U.S. Application Data (60) Provisional application No. 62/137,666, filed on Mar. 24, 2015.

(51) Int. Cl.
*H05B 37/02* (2006.01)

(52) U.S. Cl.
CPC .................... *H05B 37/0218* (2013.01)

(58) Field of Classification Search
CPC .............. H05B 37/0218; H05B 37/03; H05B 37/0281; H05B 33/0815; Y02B 20/46; Y02B 20/42; Y02B 20/72; Y02B 20/346; Y02B 20/40
See application file for complete search history.

(56) References Cited

U.S. PATENT DOCUMENTS

| | | | |
|---|---|---|---|
| 2,240,050 A | 4/1941 | Nuebling | |
| 2,745,055 A | 5/1956 | Woerdemann | |
| 3,374,396 A | 3/1968 | Bell et al. | |
| 4,153,927 A | 5/1979 | Owens | |
| 4,237,377 A | 12/1980 | Sansum | |
| 4,663,521 A | 5/1987 | Maile | |
| 5,086,379 A | 2/1992 | Denison et al. | |
| 5,160,202 A | 11/1992 | Légaré | |
| 5,161,107 A | 11/1992 | Mayeaux et al. | |
| 5,230,556 A | 7/1993 | Canty et al. | |
| 5,276,385 A | 1/1994 | Itoh et al. | |

(Continued)

FOREIGN PATENT DOCUMENTS

| | | |
|---|---|---|
| DE | 40 01 980 A1 | 8/1990 |
| EP | 1 734 795 A1 | 12/2006 |

(Continued)

OTHER PUBLICATIONS

"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.

(Continued)

*Primary Examiner* — Jany Richardson
(74) *Attorney, Agent, or Firm* — Seed IP Law Group PLLC (57) ABSTRACT

Photocontrol apparatus that controls a luminaire or other load such that the luminaire is switched on during nighttime hours and off during the daytime. The photocontrol generates a micro-amp power supply using the voltage generated across a high value resistor in series with an alternating current (AC) power line. The photocontrol consumes only microwatts of power in either the ON or the OFF state, unlike traditional relay- or triac-based photocontrols. The photocontrol does not require a voltage generating photo sensor to generate power for the photocontrol. A solar cell, semiconductor photo diode or photo diode string, cadmium sulfide cell, semiconductor ambient light sensor, etc., may be used as the sensor element.

28 Claims, 5 Drawing Sheets

(56) References Cited

U.S. PATENT DOCUMENTS

| | | |
|---|---|---|
| 5,343,121 A | 8/1994 | Terman et al. |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 5,869,960 A | 2/1999 | Brand |
| 5,892,331 A | 4/1999 | Hollaway |
| 5,892,335 A | 4/1999 | Archer |
| 5,936,362 A | 8/1999 | Alt et al. |
| 6,111,739 A | 8/2000 | Wu et al. |
| 6,149,283 A | 11/2000 | Conway et al. |
| 6,154,015 A | 11/2000 | Ichiba |
| 6,160,353 A | 12/2000 | Mancuso |
| 6,377,191 B1 | 4/2002 | Takubo |
| 6,452,339 B1 * | 9/2002 | Morrissey .............. H05B 37/03 315/119 |
| 6,612,720 B1 | 9/2003 | Beadle |
| 6,674,060 B2 | 1/2004 | Antila |
| 6,681,195 B1 | 1/2004 | Poland et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-johansen |
| 6,902,292 B2 | 6/2005 | Lai |
| 6,985,827 B2 | 1/2006 | Williams et al. |
| 7,019,276 B2 | 3/2006 | Cloutier et al. |
| 7,066,622 B2 | 6/2006 | Alessio |
| 7,081,722 B1 | 7/2006 | Huynh et al. |
| 7,122,976 B1 | 10/2006 | Null et al. |
| 7,188,967 B2 | 3/2007 | Dalton et al. |
| 7,190,121 B2 | 3/2007 | Rose et al. |
| 7,196,477 B2 | 3/2007 | Richmond |
| 7,239,087 B2 | 7/2007 | Ball |
| 7,252,385 B2 | 8/2007 | Engle et al. |
| 7,258,464 B2 | 8/2007 | Morris et al. |
| 7,270,441 B2 | 9/2007 | Fiene |
| 7,281,820 B2 | 10/2007 | Bayat et al. |
| 7,294,973 B2 | 11/2007 | Takahama et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Null et al. |
| 7,438,440 B2 | 10/2008 | Dorogi |
| 7,440,280 B2 | 10/2008 | Shuy |
| 7,468,723 B1 | 12/2008 | Collins |
| 7,524,089 B2 | 4/2009 | Park |
| 7,538,499 B2 | 5/2009 | Ashdown |
| 7,547,113 B2 | 6/2009 | Lee |
| 7,559,674 B2 | 7/2009 | He et al. |
| 7,564,198 B2 | 7/2009 | Yamamoto et al. |
| 7,569,802 B1 | 8/2009 | Mullins |
| 7,578,596 B2 | 8/2009 | Martin |
| 7,578,597 B2 | 8/2009 | Hoover et al. |
| 7,627,372 B2 | 12/2009 | Vaisnys et al. |
| 7,631,324 B2 | 12/2009 | Buonasera et al. |
| 7,633,463 B2 | 12/2009 | Negru |
| 7,638,743 B2 | 12/2009 | Bartol et al. |
| 7,677,753 B1 | 3/2010 | Wills |
| 7,688,002 B2 | 3/2010 | Ashdown et al. |
| 7,688,222 B2 | 3/2010 | Peddie et al. |
| 7,702,135 B2 | 4/2010 | Hill et al. |
| 7,703,951 B2 | 4/2010 | Piepgras et al. |
| 7,746,003 B2 | 6/2010 | Verfuerth et al. |
| D621,410 S | 8/2010 | Verfuerth et al. |
| D621,411 S | 8/2010 | Verfuerth et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,983,817 B2 | 7/2011 | Breed |
| 7,985,005 B2 | 7/2011 | Alexander et al. |
| 8,100,552 B2 | 1/2012 | Spero |
| 8,118,456 B2 | 2/2012 | Reed et al. |
| 8,143,769 B2 | 3/2012 | Li |
| 8,174,212 B2 | 5/2012 | Tziony et al. |
| 8,207,830 B2 | 6/2012 | Rutjes et al. |
| 8,290,710 B2 | 10/2012 | Cleland et al. |
| 8,334,640 B2 | 12/2012 | Reed et al. |
| 8,344,665 B2 | 1/2013 | Verfuerth et al. |
| 8,376,583 B2 | 2/2013 | Wang et al. |
| 8,378,563 B2 | 2/2013 | Reed et al. |
| 8,395,329 B2 | 3/2013 | Jutras et al. |
| 8,445,826 B2 | 5/2013 | Verfuerth |
| 8,450,670 B2 | 5/2013 | Verfuerth et al. |
| 8,476,565 B2 | 7/2013 | Verfuerth |
| 8,508,137 B2 | 8/2013 | Reed |
| 8,541,950 B2 | 9/2013 | Reed |
| 8,586,902 B2 | 11/2013 | Verfuerth |
| 8,604,701 B2 | 12/2013 | Verfuerth et al. |
| 8,610,358 B2 | 12/2013 | Reed |
| 8,629,621 B2 | 1/2014 | Reed |
| 8,749,635 B2 | 6/2014 | Högasten et al. |
| 8,764,237 B2 | 7/2014 | Wang et al. |
| 8,779,340 B2 | 7/2014 | Verfuerth et al. |
| 8,779,686 B2 | 7/2014 | Jin |
| 8,810,138 B2 | 8/2014 | Reed |
| 8,866,392 B2 | 10/2014 | Chen |
| 8,866,582 B2 | 10/2014 | Verfuerth et al. |
| 8,872,430 B2 | 10/2014 | Yang |
| 8,872,964 B2 | 10/2014 | Reed et al. |
| 8,878,440 B2 | 11/2014 | Reed |
| 8,884,203 B2 | 11/2014 | Verfuerth et al. |
| 8,896,215 B2 | 11/2014 | Reed et al. |
| 8,901,825 B2 | 12/2014 | Reed |
| 8,921,751 B2 | 12/2014 | Verfuerth |
| 8,922,124 B2 | 12/2014 | Reed et al. |
| 8,926,138 B2 | 1/2015 | Reed et al. |
| 8,926,139 B2 | 1/2015 | Reed et al. |
| 8,987,992 B2 | 3/2015 | Reed |
| 9,084,310 B2 | 7/2015 | Bedell et al. |
| 9,210,751 B2 | 12/2015 | Reed |
| 9,210,759 B2 | 12/2015 | Reed |
| 2002/0084767 A1 | 7/2002 | Arai |
| 2003/0016143 A1 | 1/2003 | Ghazarian |
| 2003/0184672 A1 | 10/2003 | Wu et al. |
| 2004/0192227 A1 | 9/2004 | Beach et al. |
| 2005/0117344 A1 | 6/2005 | Bucher et al. |
| 2005/0174762 A1 | 8/2005 | Fogerlie |
| 2005/0231133 A1 | 10/2005 | Lys |
| 2006/0014118 A1 | 1/2006 | Utama |
| 2006/0066264 A1 | 3/2006 | Ishigaki et al. |
| 2006/0098440 A1 | 5/2006 | Allen |
| 2006/0146652 A1 | 7/2006 | Huizi et al. |
| 2006/0208667 A1 | 9/2006 | Lys et al. |
| 2007/0032990 A1 | 2/2007 | Williams et al. |
| 2007/0102033 A1 | 5/2007 | Petrocy |
| 2007/0153524 A1 * | 7/2007 | Lee .................. H05B 37/0218 362/276 |
| 2007/0164689 A1 | 7/2007 | Suzuki |
| 2007/0224461 A1 | 9/2007 | Oh |
| 2007/0225933 A1 | 9/2007 | Shimomura |
| 2008/0018261 A1 | 1/2008 | Kastner |
| 2008/0043106 A1 | 2/2008 | Hassapis et al. |
| 2008/0062687 A1 | 3/2008 | Behar et al. |
| 2008/0130304 A1 | 6/2008 | Rash et al. |
| 2008/0215279 A1 | 9/2008 | Salsbury et al. |
| 2008/0224623 A1 | 9/2008 | Yu |
| 2008/0232116 A1 | 9/2008 | Kim |
| 2008/0248837 A1 | 10/2008 | Kunkel |
| 2008/0266839 A1 | 10/2008 | Claypool et al. |
| 2009/0046151 A1 | 2/2009 | Nagaoka et al. |
| 2009/0058320 A1 | 3/2009 | Chou et al. |
| 2009/0129067 A1 | 5/2009 | Fan et al. |
| 2009/0153062 A1 | 6/2009 | Guo et al. |
| 2009/0160358 A1 | 6/2009 | Leiderman |
| 2009/0161356 A1 | 6/2009 | Negley et al. |

(56) References Cited

U.S. PATENT DOCUMENTS

| | | |
|---|---|---|
| 2009/0167203 A1 | 7/2009 | Dahlman et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0273290 A1 | 11/2009 | Ziegenfuss |
| 2009/0278479 A1 | 11/2009 | Platner et al. |
| 2010/0001652 A1 | 1/2010 | Damsleth |
| 2010/0052557 A1 | 3/2010 | Van Der Veen et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1 | 7/2010 | Draper et al. |
| 2010/0244708 A1 | 9/2010 | Cheung et al. |
| 2010/0259193 A1 | 10/2010 | Umezawa et al. |
| 2010/0270945 A1 | 10/2010 | Chang et al. |
| 2010/0271802 A1 | 10/2010 | Recker et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0204845 A1 | 8/2011 | Paparo et al. |
| 2011/0215731 A1 | 9/2011 | Jeong et al. |
| 2011/0221346 A1 | 9/2011 | Lee et al. |
| 2011/0248812 A1 | 10/2011 | Hu et al. |
| 2011/0251751 A1 | 10/2011 | Knight |
| 2011/0260624 A1* | 10/2011 | Bigge ............ H05B 37/02 315/119 |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0119669 A1 | 5/2012 | Melanson et al. |
| 2012/0119682 A1 | 5/2012 | Warton |
| 2012/0143383 A1 | 6/2012 | Cooperrider et al. |
| 2012/0153854 A1 | 6/2012 | Setomoto et al. |
| 2012/0169053 A1 | 7/2012 | Tchoryk, Jr. et al. |
| 2012/0181935 A1 | 7/2012 | Velazquez |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0242254 A1 | 9/2012 | Kim et al. |
| 2013/0033183 A1 | 2/2013 | Verfuerth et al. |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0154488 A1 | 6/2013 | Sadwick et al. |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0249479 A1 | 9/2013 | Partovi |
| 2013/0293112 A1 | 11/2013 | Reed et al. |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0055990 A1 | 2/2014 | Reed |
| 2014/0070964 A1 | 3/2014 | Rupprath et al. |
| 2014/0078308 A1 | 3/2014 | Verfuerth |
| 2014/0097759 A1 | 4/2014 | Verfuerth et al. |
| 2014/0159585 A1 | 6/2014 | Reed |
| 2014/0203714 A1 | 7/2014 | Zhang et al. |
| 2014/0225521 A1* | 8/2014 | Reed ............ H05B 37/02 315/201 |
| 2014/0244044 A1 | 8/2014 | Davis et al. |
| 2014/0265894 A1 | 9/2014 | Weaver |
| 2014/0265897 A1 | 9/2014 | Taipale et al. |
| 2014/0313719 A1 | 10/2014 | Wang et al. |
| 2015/0015716 A1 | 1/2015 | Reed et al. |
| 2015/0028693 A1* | 1/2015 | Reed ............ H01H 9/54 307/117 |
| 2015/0077019 A1 | 3/2015 | Reed et al. |
| 2015/0084520 A1 | 3/2015 | Reed |
| 2015/0137693 A1 | 5/2015 | Reed |
| 2015/0208479 A1 | 7/2015 | Radermacher et al. |
| 2015/0280782 A1 | 10/2015 | Arbinger et al. |
| 2015/0312983 A1 | 10/2015 | Hu et al. |
| 2016/0021713 A1 | 1/2016 | Reed |

FOREIGN PATENT DOCUMENTS

| | | |
|---|---|---|
| EP | 2 559 937 A1 | 2/2013 |
| EP | 1 459 600 B1 | 2/2014 |
| EP | 2 781 138 A1 | 9/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-529177 A | 7/2008 |
| JP | 2008-535279 A | 8/2008 |
| JP | 2010-504628 A | 2/2010 |
| KR | 10-2005-0078403 A | 8/2005 |
| KR | 10-2006-0071869 A | 6/2006 |
| KR | 10-2006-0086254 A | 7/2006 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| KR | 10-1592013 B1 | 2/2016 |
| WO | 02/076068 A1 | 9/2002 |
| WO | 03/056882 A1 | 7/2003 |
| WO | 2005/003625 A1 | 1/2005 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2011/063302 A2 | 5/2011 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2011/129309 A1 | 5/2014 |
| WO | 2014/078854 A1 | 5/2014 |
| WO | 2012/006710 A1 | 3/2016 |

OTHER PUBLICATIONS

EE Herald, "Devices to protect High brightness LED from ESD," dated Mar. 16, 2009, retrieved Jun. 10, 2011, retrieved from http://www.eeherald.com/section/new-products/np100779.html, 1 page.

Extended European Search Report, dated Aug. 13, 2014, for corresponding European Application No. 09826926.9, 8 pages.

Extended European Search Report, dated Oct. 15, 2015, for corresponding European Application No. 12825132.9-1802, 5 pages.

Extended European Search Report, dated Sep. 28, 2015, for corresponding European Application No. 12850159.0-1802, 6 pages.

Extended European Search Report dated Oct. 21, 2015, for corresponding EP Application No. 13835001.2-1802, 7 pages.

Extended European Search Report dated Jan. 4, 2016, for corresponding EP Application No. 13823055,2-1802, 7 pages.

(56) References Cited

OTHER PUBLICATIONS

Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.

Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.

International Search Report, mailed Jul. 9, 2009 for PCT/US2009/043171, 5 pages.

International Search Report, mailed Jun. 21, 2010 for PCT/US2009/064625, 3 pages.

International Search Report, mailed Dec. 13, 2010 for PCT/US2010/035649, 3 pages.

International Search Report, mailed Dec. 15, 2010 for PCT/US2010/035658, 3 pages.

International Search Report, mailed Dec. 28, 2010 for PCT/US2010/035651, 3 pages.

International Search Report, mailed Oct. 8, 2012 for PCT/US2012/033059, 3 pages.

International Search Report, mailed Jan. 14, 2013, for PCT/US2012/052009, 3 pages.

International Search Report, mailed Feb. 27, 2013, for PCT/US2012/065476, 3 pages.

International Search Report, mailed Nov. 19, 2013 for PCT/US2013/052092, 4 pages.

International Search Report, mailed Dec. 30, 2013 for PCT/US2013/058266, 3 pages.

International Search Report mailed Nov. 11, 2014, for International Application No. PCT/US2014/047867, 3 pages.

International Search Report and Written Opinion, mailed May 7, 2015, for International Application No. PCT/US2015/013512, 15 pages.

Japanese Office Action, dated Jan. 6, 2015, for corresponding Japanese Application No. 2011-536564, 6 pages.

Kadirvel et al., "Self-Powered, Ambient Light Sensor Using bq25504," Texas Instruments, Application Report, SLUA629-Jan. 2012, 6 pages.

Korean Office Action with English Translation, dated Nov. 18, 2015, for corresponding Kr Application No. 10-2011-7014088, 14 pages.

Littelfuse, "Application Note: Protecting LEDs in Product Designs," 2009, 2 pages.

Panasonic Electronic Components, "LED Lighting Solutions," 2009, 6 pages.

Poplawski, "Exploring Flicker & LEDs," 2010 DOE SSL Market Introduction Workshop, U.S. Department of Energy, Jul. 22, 2010, 16 pages.

Reed et al., "Adjustable Output Solid-State Lamp With Security Features," Office Action mailed Feb. 27, 2014, for U.S. Appl. No. 13/679,687, 11 pages.

Reed et al., "Adjustable Output Solid-State Lamp With Security Features," Amendment filed Jun. 24, 2014, for U.S. Appl. No. 13/679,687, 11 pages.

Reed et al., "Adjustable Output Solid-State Lamp With Security Features," Notice of Allowance mailed Aug. 29, 2014, for U.S. Appl. No. 13/679,687, 9 pages.

Reed et al., "Apparatus and Method for Schedule Based Operation of a Luminaire," Office Action mailed Mar. 26, 2014, for U.S. Appl. No. 13/604,327, 10 pages.

Reed et al., "Apparatus and Method for Schedule Based Operation of a Luminaire," Amendment filed Jun. 24, 2014, for U.S. Appl. No. 13/604,327, 14 pages.

Reed et al., "Apparatus and Method for Schedule Based Operation of a Luminaire," Notice of Allowance mailed Jul. 7, 2014, for U.S. Appl. No. 13/604,327, 8 pages.

Reed et al., "Apparatus and Method for Schedule Based Operations of a Luminaire," Office Action mailed Mar. 2, 2015, for U.S. Appl. No. 14/552,274, 7 pages.

Reed et al., "Apparatus and Method for Schedule Based Operation of a Luminaire" Amendment filed Jun. 1, 2015, for U.S. Appl. No. 14/552,274, 14 pages.

Reed et al., "Apparatus and Method for Schedule Based Operation of a Luminaire" Notice of Allowance mailed Jun. 19, 2015, for U.S. Appl. No. 14/552,274, 9 pages.

Reed et al., "Apparatus and Method of Operating a Luminaire," Office Action mailed Dec. 22, 2014, for U.S. Appl. No. 13/558,191, 17 pages.

Reed et al., "Apparatus and Method of Operating a Luminaire," Amendment filed Mar. 19, 2015, for U.S. Appl. No. 13/558,191, 20 pages.

Reed et al., "Apparatus and Method of Operating a Luminaire," Notice of Allowance mailed Apr. 27, 2015, for U.S. Appl. No. 13/558,191, 8 pages.

Reed et al., "Long-Range Motion Detection for Illumination Control," Office Action mailed Dec. 21, 2012, for U.S. Appl. No. 12/784,080, 26 pages.

Reed et al., "Long-Range Motion Detection for Illumination Control," Amendment filed Apr. 22, 2013, for U.S. Appl. No. 12/784,080, 17 pages.

Reed et al., "Long-Range Motion Detection for Illumination Control," Office Action mailed Jul. 22, 2013, for U.S. Appl. No. 12/784,080, 29 pages.

Reed et al., "Long-Range Motion Detection for Illumination Control," Amendment filed Sep. 27, 2013, for U.S. Appl. No. 12/784,080, 20 pages.

Reed et al., "Long-Range Motion Detection for Illumination Control," Office Action mailed Jan. 30, 2014, for U.S. Appl. No. 12/784,080, 26 pages.

Reed et al., "Long-Range Motion Detection for Illumination Control," Amendment filed Apr. 28, 2014, for U.S. Appl. No. 12/784,080, 20 pages.

Reed et al., "Long-Range Motion Detection for Illumination Control," Notice of Allowance mailed Jun. 20, 2014, for U.S. Appl. No. 12/784,080, 7 pages.

Reed et al., "Long-Range Motion Detection for Illumination Control," Office Action mailed Sep. 17, 2015, for U.S. Appl. No. 14/500,512, 17 pages.

Reed et al., "Long-Range Motion Detection for Illumination Control," Amendment filed Dec. 10, 2015, for U.S. Appl. No. 14/500,512, 18 pages.

Reed et al., "Long-Range Motion Detection for Illumination Control," Office Action mailed Mar. 4, 2016, for U.S. Appl. No. 14/500,512, 18 pages.

Reed et al., "Low-Profile Pathway Illumination System," Office Action, dated May 5, 2011, for U.S. Appl. No. 12/437,472, 24 pages.

Reed et al., "Low-Profile Pathway Illumination System," Amendment filed Jul. 29, 2011, for U.S. Appl. No. 12/437,472, 19 pages.

Reed et al., "Low-Profile Pathway Illumination System," Notice of Allowance, dated Oct. 14, 2011, for U.S. Appl. No. 12/437,472, 9 pages.

Reed et al., "Remotely Adjustable Solid-State Lamp," Amendment filed Apr. 1, 2015, for U.S. Appl. No. 13/875,130, 14 pages.

Reed et al., "Remotely Adjustable Solid-State Lamp," Office Action mailed Apr. 21, 2015, for U.S. Appl. No. 13/875,130, 10 pages.

Reed et al., "Remotely Adjustable Solid-State Lamp," Amendment filed Jul. 20, 2015, for U.S. Appl. No. 13/875,130, 15 pages.

Reed et al., "Remotely Adjustable Solid-State Lamp," Corrected Notice of Allowance, mailed Aug. 12, 2015, and Notice of Allowance, mailed Jul. 31, 2015 for U.S. Appl. No. 13/875,130, 11 pages.

Reed et al., "Systems and Methods That Employ Object Recognition," Office Action mailed Aug. 25, 2014, for U.S. Appl. No. 13/411,321, 35 pages.

Reed et al., "Systems and Methods That Employ Object Recognition," Amendment filed Nov. 21, 2014, for U.S. Appl. No. 13/411,321, 20 pages.

Reed et al., "Systems and Methods That Employ Object Recognition," Office Action mailed Feb. 9, 2015, for U.S. Appl. No. 13/411,321, 40 pages.

(56) References Cited

OTHER PUBLICATIONS

Reed et al., "Systems and Methods That Employ Object Recognition," Amendment filed May 6, 2015, for U.S. Appl. No. 13/411,321, 20 pages.
Reed et al., "Systems and Methods That Employ Object Recognition," Amendment filed Jul. 7, 2015, for U.S. Appl. No. 13/411,321, 21 pages.
Reed et al., "Systems and Methods That Employ Object Recognition," Office Action mailed Dec. 7, 2015, for U.S. Appl. No. 13/411,321, 47 pages.
Reed et al., "Systems and Methods That Employ Object Recognition," Amendment filed Mar. 7, 2016, for U.S. Appl. No. 13/411,321, 16 pages.
Reed, "Adjustable Output Solid-State Lighting Device," Office Acton mailed Jan. 2, 2015, for U.S. Appl. No. 13/707,123, 24 pages.
Reed, "Adjustable Output Solid-State Lighting Device," Amendment filed Apr. 2, 2015, for U.S. Appl. No. 13/707,123, 14 pages.
Reed, "Adjustable Output Solid-State Lighting Device," Office Action mailed Oct. 5, 2015, for U.S. Appl. No. 13/707,123, 24 pages.
Reed, "Adjustable Output Solid-State Lighting Device," Amendment filed Jan. 8, 2016, for U.S. Appl. No. 13/707,123, 11 pages.
Reed, "Adjustable Output Solid-State Lighting Device," Notice of Allowance mailed Feb. 25, 2016, for U.S. Appl. No. 13/707,123, 9 pages.
Reed, "Ambient Light Control in Solid State Lamps and Luminaires," U.S. Appl. No. 14/609,168, filed Jan. 29, 2015, 77 pages.
Reed, "Ambient Light Control in Solid State Lamps and Luminaires," Amendment filed Jan. 29, 2015, for U.S. Appl. No. 14/609,168, 12 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination Using Received Signals," Office Action mailed Oct. 1, 2013, for U.S. Appl. No. 13/085,301, 11 pages.
Reed, "Apparatus and Method of Energy Efficient Illumination Using Received Signals," Office Action mailed Jan. 2, 2014, for U.S. Appl. No. 13/085,301, 26 pages.
Reed, "Apparatus and Method of Energy Efficient Illumination Using Received Signals," Office Action mailed Apr. 23, 2014, for U.S. Appl. No. 13/085,301, 12 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electronic Control to Regulate Power for Solid-State Lighting and Methods Thereof," Office Action mailed Mar. 26, 2014, for U.S. Appl. No. 12/619,535, 16 pages.
Reed, "Electronic Control to Regulate Power for Solid-State Lighting and Methods Thereof," Amendment filed May 27, 2014, for U.S. Appl. No. 12/619,535, 22 pages.
Reed, "Electronic Control to Regulate Power for Solid-State Lighting and Methods Thereof," Office Action mailed Aug. 14, 2014, for U.S. Appl. No. 12/619,535, 16 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Electronic Control to Regulate Power for Solid-State Lighting and Methods Thereof," Notice of Allowance mailed Apr. 23, 2015, for U.S. Appl. No. 12/619,535, 8 pages.
Reed et al., "Electrostatic Discharge Protection for Luminaire," Office Action mailed Mar. 15, 2013 for U.S. Appl. No. 13/212,074, 11 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "High Efficiency Power Controller for Luminaire," Office Action mailed Sep. 10, 2015, for U.S. Appl. No. 14/546,354, 15 pages.
Reed, "High Efficiency Power Controller for Luminaire," Amendment filed Feb. 9, 2016, for U.S. Appl. No. 14/546,354, 11 pages.
Reed, "Low Power Photocontrol for Luminaire," U.S. Appl. No. 14/844,944, filed Sep. 3, 2015, 45 pages.
Reed et al., "Luminaire With Adjustable Illumination Pattern," U.S. Appl. No. 14/939,856, filed Nov. 12, 2015, 69 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
Reed, "Luminaire With Switch-Mode Converter Power Monitoring," Notice of Allowance mailed Nov. 18, 2015, for U.S. Appl. No. 14/074,166, 9 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Lighting, Drive Circuit and Method of Driving Same," Notice of Allowance Mailed Aug. 4, 2015, for U.S. Appl. No. 13/875,000, 10 pages.

(56) References Cited

OTHER PUBLICATIONS

Reed, "Systems, Methods, and Apparatuses for Using a High Current Switching Device As a Logic Level Sensor," Notice of Allowance for U.S. Appl. No. 14/179,737, mailed Nov. 6, 2015, 9 pages.
Renesas Electronics, "Zener Diodes for Surge Absorption—Applications of high-intensity LED," Apr. 2010, 1 page.
Tyco Electronics, "Circuit Protection," retrieved Jun. 10, 2011, retrieved from http://www.tycoelectronics.com/en/products/circuit-protection.html, 2 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Oct. 8, 2012 for PCT/US2012/033059, 3 pages.
Written Opinion, mailed Jan. 14, 2013, for PCT/US2012/052009, 5 pages.
Written Opinion, mailed Feb. 27, 2013, for PCT/US2012/065476, 8 pages.
Written Opinion, mailed Nov. 19, 2013 for PCT/US2013/052092, 7 pages.
Written Opinion, mailed Dec. 30, 2013 for PCT/US2013/058266, 8 pages.
Written Opinion mailed Nov. 11, 2014, for International Application No. PCT/US2014/047867, 5 pages.
Extended European Search Report, dated Apr. 11, 2016, for corresponding European Application No. 16152644.7, 8 pages.
Extended European Search Report, dated May 3, 2016, for corresponding European Application No. 12771286.7, 9 pages.
Reed, "Electronic Control to Regulate Power for Solid-State Lighting and Methods Thereof," Office Action mailed May 9, 2016 for U.S. Appl. No. 14/806,500, 18 pages.
Reed, "High Efficiency Power Controller for Luminaire," Notice of Allowance mailed Apr. 11, 2016, for U.S. Appl. No. 14/546,354, 5 pages.
Reed, "Low Power Photocontrol for Luminaire," Office Action mailed Apr. 27, 2016, for U.S. Appl. No. 14/844,944, 10 pages.
Reed, "Solid State Hospitality Lamp," Office Action mailed Apr. 15, 2016, for U.S. Appl. No. 13/973,696, 11 pages.
Korean Office Action with English Translation, dated May 16, 2016, for corresponding KR Application No. 10-2011-7014088, 22 pages.
Reed et al., "Apparatus and Method for Schedule Based Operation of a Luminaire," Amendment filed Jun. 7, 2016, for U.S. Appl. No. 14/552,274, 14 pages.
Reed, "Low Power Photocontrol for Luminaire," Amendment filed Jun. 13, 2016, for U.S. Appl. No. 14/844,944, 10 pages.

\* cited by examiner

LOW POWER PHOTOCONTROL FOR LUMINAIRE

BACKGROUND

1. Technical Field

The present disclosure generally relates to the field of photocontrols and, more particularly, low-power photocontrols used with luminaires.

2. Description of the Related Art

A photocontrol is a device that switches or controls electrical loads based on ambient light levels. As an example, a photocontrol can be used as a switch that provides electrical power to a luminaire only when detected light levels are below a desired level. Photocontrols used for such luminaires may include photosensors that are electrically and operably coupled to switching devices rated for use at relatively high line voltages (e.g., 90 VAC to 600 VAC) and at relatively high currents (e.g., amperes and higher). For example, a photocontrol for a luminaire may include a photosensor that controls an electro-mechanical relay coupled between a source of electrical power and a control device (e.g., a magnetic or electronic transformer) within the luminaire. The electro-mechanical relay may be configured to be in an electrically continuous state unless a signal from the photosensor is present to supply power to the luminaire. If the photosensor is illuminated with a sufficient amount of light, the photosensor outputs the signal that causes the electro-mechanical relay to switch to an electrically discontinuous state such that no power is supplied to the luminaire.

Conventional photocontrols used with luminaires suffer from a number of drawbacks. For example, such photocontrols may include small power sources that use "capacitive drop" technology to power a circuit of discrete transistors, integrated circuit operational amplifiers, or comparators. Conventional photocontrols using such technology can consume considerable amounts of power when the luminaire is ON and when the luminaire is OFF.

Additionally, a typical electro-mechanical relay used with a photocontrol for a luminaire has a relatively short life span. For example, electro-mechanical relays of conventional photocontrols used with luminaires may be rated to have only 5000 contactor closures with standard loads. Arching caused by high capacitive in-rush currents of electronically ballasted luminaires and inductive "kick back" of magnetically ballasted luminaires can corrode the contactors of the electro-mechanical relays. Additionally, the contactors may include silver or other metal alloys upon which oxides and sulfides may form during normal operation. At line voltage and current, such oxides and sulfides may present a negligible resistance to the passage of current through the contactors. However, at relatively low voltages (e.g., 2 V to 24 V) and relatively low currents (e.g., μA) such as those used for digital logic level signaling, the impedance presented by contaminants including oxide and sulfide accumulations can hinder or even prevent the transmission of current through the contactors. Thus, conventional photocontrols for luminaires can be unsuitable for use in applications where the switching of relatively low voltage and relatively low current signals is required, for example, with luminaires that include solid-state light source drivers, for example, light emitting diode (LED) drivers that receive control signals for dimming LED arrays.

In response to the increasing emphasis placed on energy efficiency, many luminaires are being retrofitted with more energy efficient light sources. For example, conventional light sources (e.g., incandescent lights) are being replaced with solid-state light sources (e.g., LED arrays). Circuitry that regulates electrical power supplied to such solid-state light source (e.g., LED drivers) may draw relatively high inrush currents when the light sources are switched on. The inrush currents of electrically ballasted light sources may cause more damage to the contactors of electro-mechanical relays than is caused by the kickback currents of magnetically ballasted light sources. Accordingly, when conventional photocontrols having electro-mechanical relays are used with luminaires having solid-state light sources, the electro-mechanical relays may fail or cease to function reliably well before their rated number of contactor closures.

There is therefore a need for photocontrols that consume very small amounts of power. Additionally, there is a need for photocontrols that can be used reliably over long periods of time with luminaires having solid-state light sources.

BRIEF SUMMARY

A photocontrol apparatus to provide a control signal to a high-impedance controller input used to control a delivery of power to a load device may be summarized as including a resistor having a first node and a second node; a switch including a first node, a second node, and a third node, the first node electrically coupled to a line node of an alternating current (AC) power source and the third node electrically coupled to the first node of the resistor, wherein the second node of the resistor is an output node of the photocontrol that is electrically coupleable to the high-impedance controller input; a first capacitor having a first node and a second node, the first node of the first capacitor electrically coupled to the first node of the switch and the second node of the first capacitor electrically coupled to the third node of the switch; a direct current (DC) power supply circuit that includes: a positive DC power supply node electrically coupled to the first node of the resistor; a negative DC power supply node; a second capacitor having a first node and a second node, the first node of the second capacitor electrically coupled to the positive DC power supply node and the second node of the second capacitor electrically coupled to the negative DC power supply node; a zener diode having a cathode and an anode, the cathode of the zener diode electrically coupled to the positive DC power supply node and the anode of the zener diode electrically coupled to the negative DC power supply node; and a diode having a cathode and an anode, the cathode of the diode electrically coupled to the second node of the resistor and the anode of the diode electrically coupled to the negative DC power supply node; a comparator including a first power supply input node, a second power supply input node, a first input node, a second input node, and an output node, wherein the output node is communicably coupled to the second node of the switch and one of the first and the second power supply input nodes of the comparator is electrically coupled to the positive DC power supply node of the DC power supply circuit and the other of the first and the second power supply input nodes of the comparator is electrically coupled to the negative DC power supply node of the DC power supply circuit; and an ambient light sensor having an output node electrically coupled to one of the first input node or the second input node of the comparator, the ambient light sensor at least partially causes a voltage level of the one of the first input node or the second input node to which the ambient light sensor is electrically coupled to change in response to the ambient light sensor being at least partially illuminated with light. The switch may be a depletion mode Metal Oxide Semiconductor Field Effect Transistor (MOSFET), the first node of the switch may be a drain node of the MOSFET, the second node of the switch may be a gate node of the MOSFET, and the third node of the switch may be a source node of the MOSFET.

The photocontrol apparatus may further include a transient voltage suppression diode having a cathode and an anode, the cathode of the transient voltage suppression diode electrically coupled to the first node of the switch and the anode of the transient voltage suppression diode electrically coupled to the third node of the switch. The first capacitor may have a capacitance less than or equal to 0.1 microfarads. The ambient light sensor may include at least one of a solar cell, a semiconductor photo diode, a cadmium sulfide (CDS) cell, or a semiconductor ambient light sensor. The resistor may have a resistance of at least 200 kilohms. The ambient light sensor may include a ground reference node electrically coupled to the negative DC power supply node of the DC power supply circuit.

The photocontrol apparatus may further include a third capacitor having a first node and a second node, the first node of the third capacitor electrically coupled to the output node of the ambient light sensor and the second node of the third capacitor electrically coupled to the negative DC power supply node of the DC power supply circuit. The resistor, the switch, the first capacitor, the second capacitor, the diode, the zener diode, and the comparator may be surface mount devices. The first capacitor may be a non-electrolytic capacitor. When the switch is in a first state and the ambient light sensor causes the voltage level of the one of the first input node or the second input node to which the output node of the ambient light sensor may be electrically coupled to fall below a first threshold voltage level the comparator causes the switch to change to a second state, and when the switch is in the second state and the ambient light sensor causes the voltage level of the one of the first input node or the second input node to which the output node of the ambient light sensor may be electrically coupled to rise above a second threshold voltage level the comparator causes the switch to change to the first state. The third node of the switch may output a first control signal when the switch is in the first state, and the third node of the switch may output a second control signal when the switch is in the second state.

The photocontrol apparatus may further include a reference voltage source electrically coupled to the one of the first input node or the second input node to which the output node of the ambient light sensor is not electrically coupled. The reference voltage source at least one of a diode or a voltage divider that may include at least two resistors. The comparator may be a comparator integrated circuit or an operational amplifier integrated circuit, or a comparator circuit composed of discrete components including a negative voltage supply node, a positive voltage supply node, a non-inverting input node, an inverting input node, and a voltage output node, and wherein the negative voltage supply node may be the first power supply input node, the positive voltage supply node may be the second power supply input node, the non-inverting input node may be the first input node, the inverting input node may be the second input node, and the voltage output node may be the output node.

The photocontrol apparatus may further include a housing at least partially enclosing the switch and the ambient light sensor, the housing including a translucent portion formed from at least one of polycarbonate or silicone.

A photocontrol apparatus to provide a control signal to a high-impedance controller input used to control a delivery of power to a load device may be summarized as including a resistor having a first node and a second node; a switch including a first node, a second node, and a third node, the first node electrically coupled to a line node of an alternating current (AC) power source and the third node electrically coupled to the first node of the resistor, wherein the second node of the resistor is an output node of the photocontrol that is electrically coupleable to the high-impedance controller input; a first capacitor having a first node and a second node, the first node of the first capacitor electrically coupled to the first node of the switch and the second node of the first capacitor electrically coupled to the third node of the switch; a direct current (DC) power supply circuit that includes: a positive DC power supply node electrically coupled to the first node of the resistor; a negative DC power supply node; a second capacitor having a first node and a second node, the first node of the second capacitor electrically coupled to the positive DC power supply node and the second node of the second capacitor electrically coupled to the negative DC power supply node; a voltage regulator having a first node and a second node, the first node of the voltage regulator electrically coupled to the positive DC power supply node and the second node of the voltage regulator electrically coupled to the negative DC power supply node; and a rectifier having a cathode and an anode, the cathode of the rectifier electrically coupled to the second node of the resistor and the anode of the rectifier electrically coupled to the negative DC power supply node; and a switch control circuit including a first power supply input node, a second power supply input node, a first input node, a second input node, and an output node, wherein the output node is communicably coupled to the second node of the switch, one of the first and the second power supply input nodes of the switch control circuit is electrically coupled to the positive DC power supply node of the DC power supply circuit and the other of the first and the second power supply input nodes of the switch control circuit is electrically coupled to the negative DC power supply node of the DC power supply circuit, and one of the first input node or the second input node of the switch control circuit is coupled to an output node of an ambient light sensor to receive a signal therefrom indicative of an ambient light level. The switch may be a depletion mode Metal Oxide Semiconductor Field Effect Transistor (MOSFET), the first node of the switch may be a drain node of the MOSFET, the second node of the switch may be a gate node of the MOSFET, and the third node of the switch may be a source node of the MOSFET.

The photocontrol apparatus may further include a transient voltage suppression diode having a cathode and an anode, the cathode of the transient voltage suppression diode electrically coupled to the first node of the switch and the anode of the transient voltage suppression diode electrically coupled to the third node of the switch. The first capacitor may have a capacitance less than or equal to 0.1 microfarads. The resistor may have a resistance of at least 200 kilohms.

The photocontrol apparatus may further include a third capacitor having a first node and a second node, the first node of the third capacitor electrically coupled to the output node of the ambient light sensor and the second node of the third capacitor electrically coupled to the negative DC power supply node of the DC power supply circuit. The resistor, the switch, the first capacitor, the second capacitor, the rectifier, the voltage regulator, and the switch control circuit may be surface mount devices. The first capacitor may be a non-electrolytic capacitor.

The photocontrol apparatus may further include a reference voltage source electrically coupled to the one of the first input node or the second input node of the switch control circuit to which the output node of the ambient light sensor is not electrically coupled. The reference voltage source at least one of a diode or a voltage divider that may include at least two resistors. The switch control circuit may include an operational amplifier including a negative voltage supply node, a positive voltage supply node, a non-inverting input node, an inverting input node, and a voltage output node, and wherein the negative voltage supply node may be the first power supply input node, the positive voltage supply node may be the second power supply input node, the non-inverting input node may be the first input node, the inverting input node may be the second input node, and the voltage output node may be the output node.

The photocontrol apparatus may further include a housing that at least partially encloses the switch, the housing including a translucent portion formed from at least one of polycarbonate or silicone.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations. In other instances, well-known mathematical and statistical methods for performing statistical analyses and other well-known mathematical operation have not been described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Implementations of the present disclosure provide a photocontrol apparatus (or "photocontrol") that controls a luminaire or other load such that the luminaire is switched on during nighttime hours and off during the daytime. The photocontrols discussed herein generate a microampere ($\mu$A) power supply using the voltage generated across a high value resistor in series with an alternating current (AC) power line, instead of using a solar cell to power the photocontrol. Further, unlike traditional "capacitor drop" or resistive power sources used in existing photocontrols which consume a relatively large amount of power, the supply voltage for the photocontrols of the present disclosure is developed across a series resistor rather than using a capacitor or resistor to limit the current to a voltage regulator (e.g., zener diode), which substantially reduces the amount of power required by the photocontrol.

The implementations of the photocontrols discussed herein consume only microwatts ($\mu$W) of power in either the ON or the OFF states, unlike traditional relay- or triac-based photocontrols. Advantageously, the implementations of the present disclosure do not require a voltage generating photo sensor to generate power for the photocontrol. Thus, unlike applications which require such a voltage generating photo sensor to generate power, a solar cell, a semiconductor photo diode or photo diode string, a cadmium sulfide (CDS) cell or a semiconductor ambient light sensor may be used as the sensor element.

Figure 1:
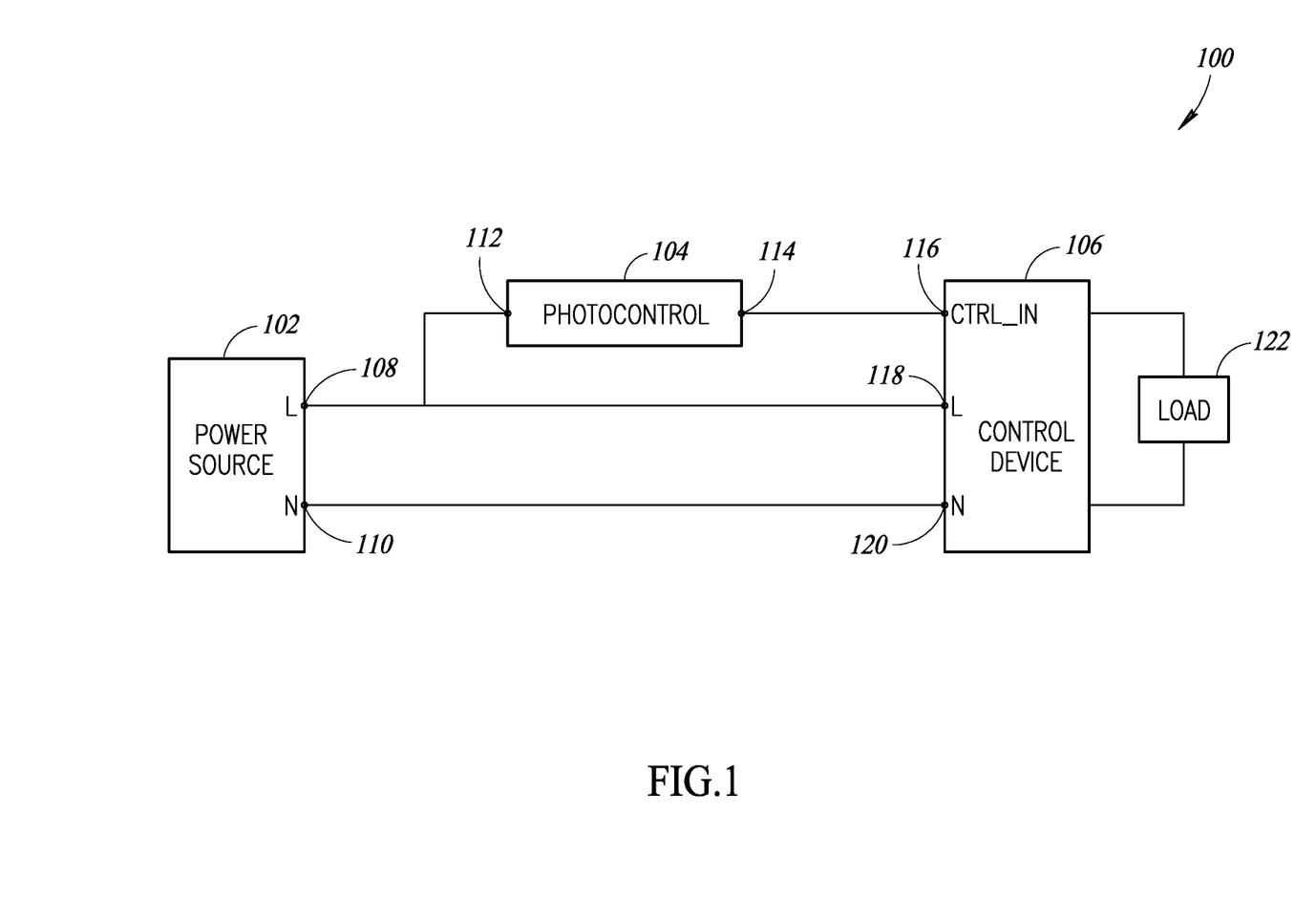
FIG. 1 is a block diagram of a control system for a luminaire that includes a photocontrol, according to one illustrated implementation.

FIG. 1 shows a control system 100, according to one illustrated implementation. The description of FIG. 1 provides an overview of the structure and operation of the control system 100. A power source 102 (e.g., mains power) provides electrical power to a photocontrol apparatus 104 and a control device 106, for example, using electrically conductive wires. More particularly, the power source 102 provides line voltage from a line node 108, which is electrically coupled to an input node 112 of the photocontrol apparatus 104 and to at line input node 118 of the control device 106. A node 110 of the power source 102 is electrically coupled to system neutral and to node 120 of the control device 106. An output control node 114 of the photocontrol apparatus 104 is electrically coupled to a high impedance control input node 116 of the control device 106. The photocontrol apparatus 104 provides control signals to the control device 106 via the nodes 114 and 116. As will be explained below, the control device 106 uses the control signals provided by the photocontrol apparatus 104 to control the supply of electrical power to a load device 122, such as an array of LEDs.

If the photocontrol apparatus 104 is not illuminated with ambient light (e.g., during nighttime), the photocontrol apparatus 104 outputs a first control signal to the control device 106. When the first control signal is received by the control device 106, the control device 106 causes electrical power to be supplied to the load device 122. For example, the control device 106 causes electrical power to be supplied to an array of LEDs such that the array of LEDs produces an amount of light. If the photocontrol apparatus 104 is illuminated with a sufficient amount of ambient light (e.g., during daytime), the photocontrol apparatus 104 outputs a second control signal to the control device 106. When the second control signal is received by the control device 106, the control device 106 reduces the amount of electrical power supplied to the load device 122. For example, the control device 106 reduces or stops the supply of electrical power to an array of LEDs such that the array of LEDs produces less light, or no light at all.

Figure 2:
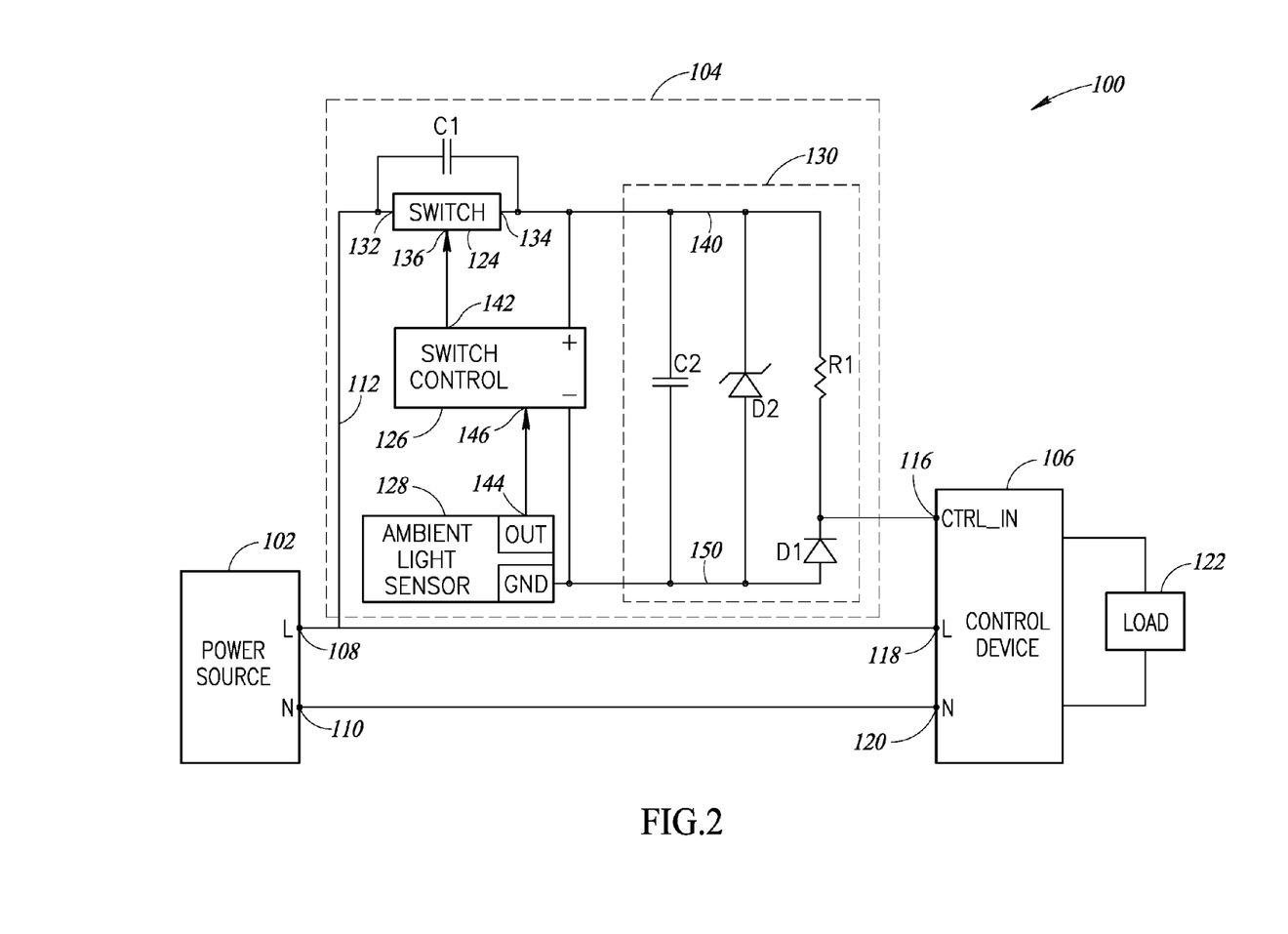
FIG. 2 is a high-level schematic diagram of a photocontrol that can be used in the control system of FIG. 1, according to one illustrated implementation.

FIG. 2 is a high-level schematic diagram of the control system 100 of FIG. 1 which shows the photocontrol apparatus 104 in further detail. The photocontrol apparatus 104 includes a switch 124, a capacitor C1 in parallel with the switch, a switch control circuit 126, an ambient light sensor 128, and a DC voltage supply circuit 130 used to power the switch control circuit. In some implementations, the capacitor C1 has a capacitance value of 0.01 and a working voltage of 600 V. In some implementations, the photocontrol apparatus 104 also includes input conditioning circuitry and/or output conditioning circuitry.

In some implementations, the switch 124 is a low threshold, n-channel, depletion mode (normally-on) Metal Oxide Semiconductor Field Effect Transistor (MOSFET), such as transistor model CPC3980ZTR from IXYS Integrated Circuits Division. In some implementations, the switch 124 is a low threshold, p-channel, enhancement mode (normally-off) MOSFET. In some implementations, the switch 124 is a low RDS (on), n-channel enhancement mode MOSFET.

The switch 124 includes an input node 132, an output node 134, and a control input node 136. For example, in some implementations, the input node 132 may be a drain node of an n-channel depletion mode MOSFET, the output node 134 may be a source node of the MOSFET, and the control input node 136 may be a gate node of the MOSFET.

The input node 132 is electrically coupled to the node 112, which can be electrically coupled to the line node 108 of the power source 102. The output node 134 is coupled to a positive DC supply node 140, and to the output node 114 through a high value resistor R1. In some implementations, the resistor R1 has a value that is greater than or equal to 200 kΩ (e.g., 510 kΩ). As noted above, the output node 114 of the photocontrol apparatus 104 is coupled to the control input node 116 of the control device 106 to provide a control signal to the control device. The control node 136 of the switch 124 is coupled to a control output node 142 of the switch control circuit 126.

The ambient light sensor 128 includes an output node 144 electrically coupled to an input node 146 of the switch control circuit 126 to provide a signal to the switch control circuit indicative of an ambient light level. The ambient light sensor 128 may be any suitable component that generates a signal (e.g., voltage, current) responsive to ambient light. For example, the ambient light sensor 128 may include a solar cell such as a Panasonic AM-5610CAR solar cell, a semiconductor photo diode or photo diode string, a cadmium sulfide (CDS) cell, a semiconductor ambient light sensor with a voltage or current output, or a digital ambient light sensor with a pulse width modulated (PWM) output if suitable filtering is added to the PWM output to convert the output to a light-dependent voltage or current output. In some implementations, the ambient light sensor 128 is an analog current output type ambient light sensor integrated circuit (IC), such as model BH1620FVC from ROHM Co. Ltd. The ambient light sensor 128 and/or the switch control circuit 126 may include appropriate interfacing circuitry (not shown in FIG. 2) which allows the switch control circuit to communicably receive the signals from the ambient light sensor.

The switch control circuit 126 is powered by the DC voltage supply circuit 130, which creates a DC voltage across the positive DC supply node 140 and a negative DC supply node 150. The DC voltage supply circuit 130 includes the series resistor R1 coupled between the positive DC supply node 140 and the output node 114, a diode D1 coupled between the output node and the negative DC supply node 150, a capacitor C2 coupled between the positive DC supply node and the negative DC supply node, and a zener diode D2 coupled between the positive DC supply node and the negative DC supply node. In some implementations, the capacitor C2 has a capacitance of 10 µF. The DC supply voltage across the positive DC supply node 140 and the negative DC supply node 150 is generated by current passing through the resistor R1, which is rectified by the diode D1. The zener diode D2 limits the supply voltage to a desired DC supply voltage (e.g., 3.3 V, 4.7 V, 6.2V). The capacitor C2 filters the DC ripple to provide a substantially stable DC supply voltage to the switch control circuit 126.

When light causes the ambient light sensor 128 to produce a sufficient amount of current or voltage or change in resistance, the switch control circuit 126 turns the switch 124 OFF. While the switch 124 is turned OFF, only a relatively small current flows through the capacitor C1 to supply the DC voltage supply circuit 130 and the control signal provided to the input node 116 of the control device 106 has a relatively low voltage level. When little or no light strikes the ambient light sensor 128, the switch control circuit 126 causes the switch 124 to turn ON. While the switch 124 is turned ON, a relatively high current can flow through the switch and the control signal provided to the input node 116 of the control device 106 can have a relatively high voltage level. The control device 106 uses this change in voltage levels at the input node 116 to selectively provide power to the load 122.

Figure 3:
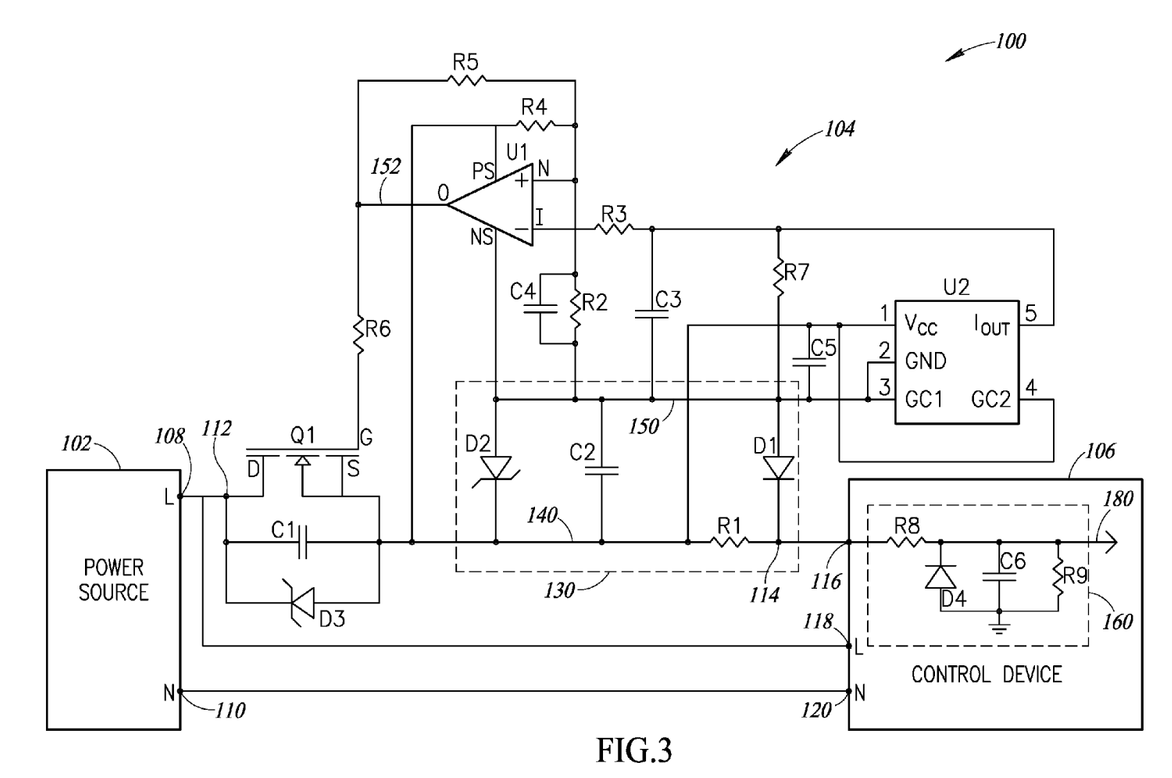
FIG. 3 is a detailed schematic diagram of a photocontrol that can be used in the control system of FIG. 1, according to one illustrated implementation.

FIG. 3 is a detailed schematic diagram of the control system 100 of FIG. 1 which shows the various components of the photocontrol apparatus 104 according to one or more implementations. The photo control apparatus 104 includes a switch Q1, the capacitor C1 in parallel with the switch, and an ambient light sensor circuit U2. A transient voltage suppression (TVS) diode D3 limits input transients that may exceed the maximum voltage rating of the switch Q1. In some implementations, the TVS diode D3 is a model SMAJ440A TVS diode offered by Littelfuse, Inc.

The photocontrol apparatus 104 also includes a switch control circuit formed by a comparator U1, capacitors C3 and C4, and resistors R2, R3, R4, R5, R6, and R7. In some implementations, capacitors C3 and C4 have capacitance values of 10 µF and 0.1 µF, respectively. In some implementations, the resistors R2, R4 and R7 have a resistance value of 1 MΩ. In some implementations, the resistors R3 and R6 have a resistance value of 1 kΩ In some implementations, the resistor R5 has a resistance value of 6.8 MΩ. As also shown in FIG. 2, the photocontrol apparatus 104 further includes the DC voltage supply 130 formed by the resistor R1, the diode D1, the zener diode D2, and the capacitor C2. The DC voltage supply 130 provides a relatively constant DC voltage between the positive DC supply node 140 and the negative DC supply node 150.

In the illustrated implementation, the switch Q1 is a low threshold, n-channel, depletion mode (normally-on) Metal Oxide Semiconductor Field Effect Transistor (MOSFET), such as transistor model CPC3980ZTR from IXYS Integrated Circuits Division. The switch Q1 includes a drain node D, a source node S, and a gate node G.

The drain node D of the switch Q1 is electrically coupled to the input node 112 of the photocontrol apparatus 104, which can be electrically coupled to the node 108 of the power source 102 of FIG. 1. The source node S of the switch Q1 is coupled to the positive DC voltage supply node 140, and to the output node 114 through the high value resistor R1. The output node 114 of the photocontrol apparatus 104 is coupled to the control input node 116 of the control device 106 to provide a control signal to the control device. The gate node G of the switch Q1 is coupled to a control output node 152 of the comparator U2 via the resistor R6.

In the illustrated implementation, the ambient light sensor U2 is an analog current output type ambient light sensor integrated circuit (IC), such as model BH1620FVC from ROHM Co. Ltd. The ambient light sensor U2 includes a $V_{cc}$ node, a GND node, an Iout node, and two gain control input control nodes GC1 and GC2 which control the gain of the ambient light sensor. The Vcc node is coupled to the positive DC supply node 140 and the GND node is coupled to the negative DC supply node 150. A capacitor C5 is coupled across the $V_{cc}$ node and the GND node to provide a stable DC voltage to the ambient light sensor U2. In some implementations, the capacitor C5 has a capacitance value of 0.1 µF. The GC1 node is coupled to the negative DC supply node 150 and the GC2 node is coupled to the positive DC supply node 140, which programs the ambient light sensor U2 to be in a medium gain mode. In operation, the ambient light sensor U2 outputs a current at the Iout node which is substantially proportional to ambient illuminance detected by the ambient light sensor.

The comparator U1 includes a positive supply voltage node PS, a negative supply voltage node NS, an inverting input node I, a non-inverting input node N, and an output node O (labeled "152"). The inverting input node I of the comparator U1 is coupled to the Iout node of the ambient light sensor U2 through the resistor R3. The capacitor C3 filters noise from the Iout node of the light sensor U2. In some implementations, the comparator U1 is a model TLV3701 comparator from Texas Instruments Inc. In the illustrated implementation, the comparator U1 operates as a trigger with hysteresis ("Schmitt trigger").

The positive supply voltage node PS of the comparator U1 is coupled to the positive DC supply node 140, which is also connected to the source node S of the switch Q1. The output node O of the comparator U1 is electrically coupled to the gate node G of the switch Q1 through the resistor R6. The resistor R5 is electrically coupled between the output node O of the comparator U1 and the non-inverting input node N of the comparator U1. The resistor R2 is electrically coupled between the non-inverting input node N of the comparator U1 and the negative DC supply node 150. The resistor R4 is electrically coupled between the non-inverting input node N of the comparator U1 and the positive DC supply node 140. The resistor R2 is electrically coupled between the inverting input node I of the comparator U1 and the negative DC supply node.

The resistor R5 provides positive feedback to the comparator U1, and causes the photocontrol apparatus to have switching hysteresis. The resistors R2 and R4 form a voltage divider that controls a reference voltage level at the non-inverting input node N of the comparator U1. The capacitor C4 bypasses noise so the reference voltage provided by the voltage divider will be relatively stable. In some implementations, the resistors R2 and R4 are included in a trimming potentiometer. In some implementations, a reference voltage may be provided using a semiconductor voltage reference or other voltage reference.

The comparator U1 and the ambient light sensor U2 are powered by the DC voltage supply circuit 130, which creates a DC voltage across the positive DC supply node 140 and the negative DC supply node 150. The DC voltage supply circuit 130 includes the series resistor R1 coupled between the positive DC supply node 140 and the output node 114, the diode D1 coupled between the output node 114 and the negative DC supply node 150, the capacitor C2 coupled between the positive DC supply node and the negative DC supply node, and the zener diode D2 coupled between the positive DC supply node and the negative DC supply node. The DC supply voltage across the positive DC supply node 140 and the negative DC supply node 150 is generated by current passing through the resistor R1, which is rectified by the diode D1, the TVS diode D3, and a body diode (not shown) of the switch Q1. The zener diode D2 limits the supply voltage to a desired DC supply voltage (e.g., 3.3 V, 4.7 V, 6.25 V). In some implementations, the zener diode D2 may be a model BZX84C4V7LT1G zener diode manufactured by Semiconductor Components Industries, LLC ("ON Semiconductor"), which has a reverse zener voltage of approximately 4.7 V. The capacitor C2 filters the DC ripple to provide a substantially stable DC supply voltage to the comparator U1 and the ambient light sensor U2.

As shown in FIG. 3, the input of the control device 106 includes an input conditioner circuit 160 which includes a diode D4, a capacitor C6, and resistors R8 and R9. The input conditioner circuit 160 is coupled to the output node 114 of the photocontrol apparatus 104. In some implementations, the capacitor C6 has a value of 10 µF, the resistor R8 has a value of 1 MΩ, and the resistor R9 has a value of 100 kΩ. The values of the components of the input conditioner circuit 160 may be selected such that the control signals output by the photocontrol apparatus 104 have voltage and current levels that are compatible with the control device 106. For example, the values of the components of the input conditioner circuit 160 may be selected such that the control signals output by the photocontrol apparatus 104 are compatible with an enable control input or a dimming control input of an LED driver incorporated within the AreaMax™ LED Area Light provided by the Evluma division of Express Imaging Systems, LLC.

Figure 4:
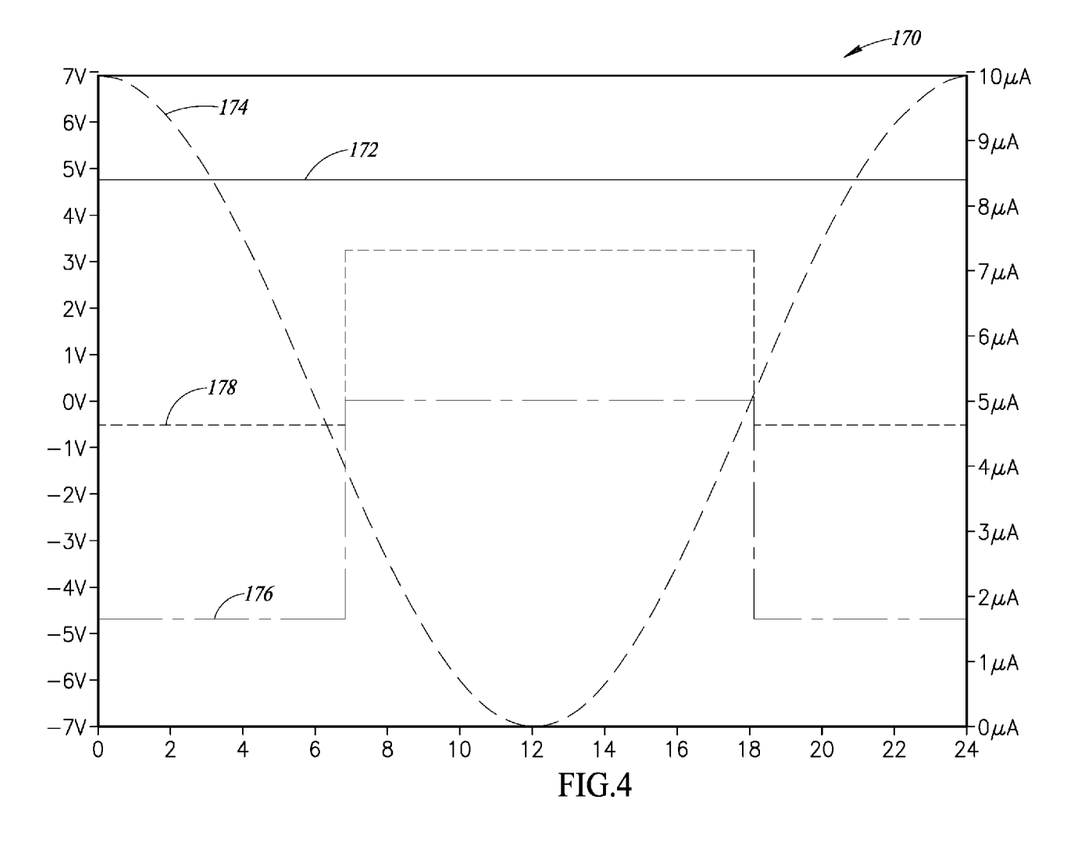
FIG. 4 is a hypothetical plot showing an output control signal of the photocontrol of FIG. 3 as a function of time, according to one illustrated implementation.

FIG. 4 is a hypothetical plot 170 which shows various signals of the photocontrol apparatus 104 shown in FIG. 3 as a function of time. Specifically, the plot 170 displays a trace 172 for the DC voltage supply voltage, which is the voltage between the positive DC supply node 140 and the negative DC supply node 150, through a 24 hour time period. In this illustration, the DC voltage supply voltage is set at approximately 4.7 V by the zener diode D2. The plot 170 also shows a trace 174 for the current output by the ambient light sensor U2 throughout the 24 hour period. Although shown in the plot 170 as a sinusoid for explanatory purposes, it should be appreciated that the shape of the current output by the ambient light sensor U2 may not be sinusoidal in practice. For example, the current output may be relatively constant for periods during the middle of the day and the middle of the night. Further, the slope of the current during transitions between day and night may be relatively steep in practice compared to the sinusoidal shape shown in FIG. 4.

The plot 170 also shows a trace 176 of the voltage $V_{GS}$ between the gate node and the source node S of the switch Q1. As discussed above, depletion mode MOSFETs are turned ON (i.e., low resistance) when $V_{GS}$ is near zero volts, and are turned OFF (i.e., high resistance) when $V_{GS}$ is more negative than a threshold voltage.

The plot 170 also shows a trace 178 of the voltage at an input conditioned node 180 (FIG. 3) of the control device 106, which is the signal provided as a control signal to the control device after the signal has been conditioned by the input conditioning circuit 160 of the control device.

When the switch Q1 is ON and the ambient light sensor is producing little or no current (e.g., nighttime), the output of the comparator U1 is the same as the voltage level of the source node S. As a result, $V_{GS}$ is approximately 0 V and the switch Q1 remains ON, which provides a relatively high voltage level signal at the output node 114 that is provided to the control device 106. In the illustrated implementation, the voltage at the input conditioned node 180 is at about 3 V when the switch Q1 is turned ON. If the ambient light sensor U2 produces enough current to cause the voltage level at the inverting input node I of the comparator U1 to rise above the voltage level at the non-inverting input node N of the comparator, the comparator outputs the voltage level provided to the negative power supply input node NS of the comparator. As result, $V_{GS}$ drops to a negative value (e.g., −4.7 V) which is more negative than the threshold voltage of the switch Q1 to cause the switch to turn OFF, which lowers the voltage of the signal at the output node 114 that is provided to the control device 106. In the illustrated implementation, the voltage at the input conditioned node 180 is at about −0.4 V when the switch Q1 is turned OFF. The control device 106 may utilize the changes in the control signal to control the operation of one or more light sources, such as an array of LEDs.

When the switch Q1 is OFF and the ambient light sensor U2 stops producing enough current to cause the voltage level at the inverting input node I of the comparator U1 to be above the voltage level at the non-inverting input node N of the comparator, the comparator outputs the voltage level provided to the positive power supply input node PS of the comparator U1.

In the illustrated implementation, the switch Q1 switches ON when the current of the ambient light sensor U2 falls to approximately 4 µA. The switch Q1 switches back OFF when the current of the ambient light sensor rises to approximately 5 µA. As noted above, the difference between the two switching points is due to the hysteresis resulting from the positive feedback provided by the resistor R5 (FIG. 3). Other levels of hysteresis may be provided by adjusting the values of resistors R2, R4, and/or R5. Hysteresis reduces the likelihood that optical or electrical noise will cause the photocontrol apparatus to switch at inappropriate times.

Figure 5:
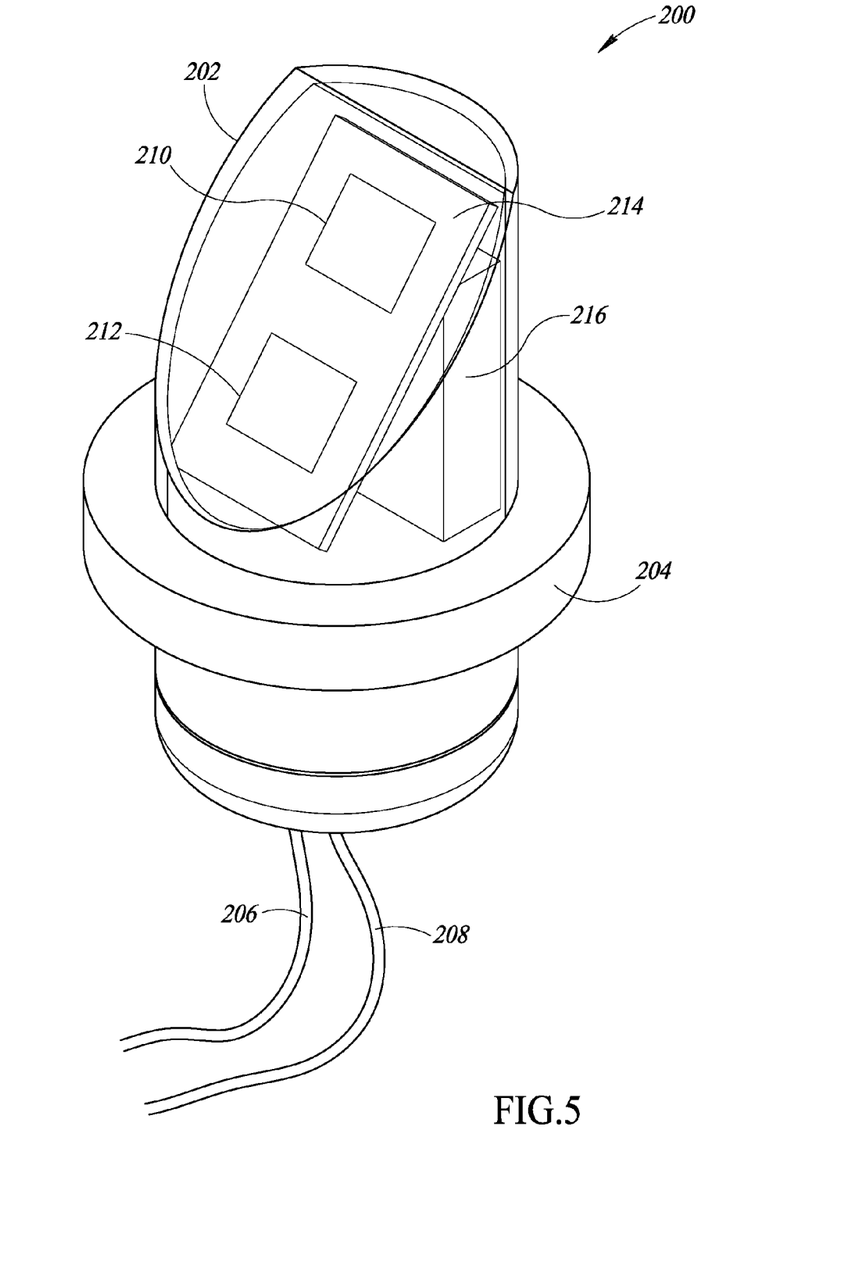
FIG. 5 is a perspective view of an example photocontrol assembly, according to one illustrated implementation.

FIG. 5 is a perspective view of a photocontrol assembly 200, according to one illustrated implementation. The photocontrol assembly 200 includes an upper transparent housing 202, a lower portion 204, and connecting wires 206 and 208 extending from the lower portion 204. The photocontrol assembly 200 may be physically coupled to a luminaire (not shown) to provide photocontrol for the luminaire. A photocontrol apparatus circuit 210 and an ambient light sensor 212 may be mounted on a printed circuit board 214 that is attached to a mounting portion 216 of the lower portion 204 such that ambient light is able to pass through the transparent housing 202 and at least partially illuminate the ambient light sensor 212. In this illustrated implementation, the ambient light sensor 212 is an integrated circuit but, as noted above, other types of ambient light sensors may be used.

In some implementations, an input node and an output node of the photocontrol apparatus circuit 210 are electrically coupled to the connecting wires 206 and 208, respectively, of the photocontrol assembly 200, respectively. In such implementations, the connecting wire 206 may be electrically coupled to the line node 108 of the power source 102 and the connecting wire 208 may be electrically coupled to the input node 116 of the control device 106.

The ambient light sensor 212 and the photocontrol apparatus circuit 210 may be assembled in the same housing or in separate housings. At least a portion of the housing 202 may be made of substantially transparent or translucent molded plastic, such as polycarbonate or silicone, or there may be a window in an otherwise opaque housing which allows ambient light to illuminate the ambient light sensor.

One or more implementations of the present disclosure provide several advantages. For example, for a 120 VAC power source, implementations discussed herein may dissipate only 0.44 milliwatts, which is much less than the 500 milliwatts dissipated by a typical commercial photo control. As another example, for a 277 VAC power source, implementations discussed herein may dissipate 16 milliwatts, which is much less than the 2,500 milliwatts dissipated by a typical commercial photocontrol.

Additionally, the implementations of the present disclosure provide photocontrols with high reliability. The use of all solid-state low power circuitry for the photocontrol provides for a lifetime far longer than the light source which the photocontrol controls. In contrast, existing commercial photocontrols are rated at only 5000 cycles with an inductive load, and are rated for fewer cycles for a capacitive load (e.g., LED driver).

The implementations discussed herein are also compact in size. Previous photocontrols required a much larger power supply and a mechanical relay or large semiconductor switch. Additionally, implementations discussed herein may be realized using surface mount devices (SMD) only. Unlike previous photocontrols, the SMD components can be automatically placed and soldered during manufacturing, which increases reliability and lowers manufacturing cost. As another advantage, the photocontrols discussed herein do not require electrolytic capacitors. Previous photocontrols often utilized electrolytic capacitors instead of non-electrolytic capacitors (e.g., ceramic) for cost and space savings, thereby undesirably reducing reliability.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. Provisional Patent Application No. 61/052,924, filed May 13, 2008; U.S. Patent Publication No. US 2009/0284155, published Nov. 19, 2009; U.S. Provisional Patent Application No. 61/051,619, filed May 8, 2008; U.S. Pat. No. 8,118,456, issued Feb. 12, 2012; U.S. Provisional Patent Application No. 61/088,651, filed Aug. 13, 2008; U.S. Patent Publication No. US 2010/0090577, published Apr. 15, 2010; U.S. Provisional Patent Application No. 61/115,438, filed Nov. 17, 2008; U.S. Provisional Patent Application No. 61/154,619, filed Feb. 23, 2009; U.S. Patent Publication No. US2010/0123403, published May 20, 2010; U.S. Provisional Patent Application No. 61/174,913, filed May 1, 2009; U.S. Patent Publication No. US2010/0277082, published Nov. 4, 2010; U.S. Provisional Patent Application No. 61/180,017, filed May 20, 2009; U.S. Patent Publication No. US2010/0295946, published Nov. 25, 2010; U.S. Provisional Patent Application No. 61/229,435, filed Jul. 29, 2009; U.S. Patent Publication No. US2011/0026264, published Feb. 3, 2011; U.S. Provisional Patent Application No. 61/295,519, filed Jan. 15, 2010; U.S. Provisional Patent Application No. 61/406,490, filed Oct. 25 2010; U.S. Patent Publication No. US2011/0175518, published Jul. 21, 2011; U.S. Provisional Patent Application Ser. No. 61/333,983, filed May 12, 2010; U.S. Patent Publication No. US2010/0295454, published Nov. 25, 2010; U.S. Provisional Patent Application Ser. No. 61/346,263, filed May 19, 2010; U.S. Patent Publication No. US2010/0295455, published Nov. 25, 2010; U.S. Provisional Patent Application Ser. No. 61/357,421, filed Jun. 22, 2010; U.S. Patent Publication No. US2011/0310605, published Dec. 22, 2011; U.S. Patent Publication No. 2012/0262069, published Oct. 18, 2012; U.S. Non-Provisional patent application Ser. No. 13/212,074, filed Aug. 17, 2011; U.S. Provisional Patent Application Ser. No. 61/527,029, filed Aug. 24, 2011; U.S. Non-Provisional patent application Ser. No. 13/592,590, filed Aug. 23, 2012; U.S. Provisional Patent Application Ser. No. 61/534,722, filed Sep. 14, 2011; U.S. Non-Provisional patent application Ser. No. 13/619,085, filed Sep. 14, 2012; U.S. Provisional Patent Application Ser. No. 61/567,308, filed Dec. 6, 2011; U.S. Provisional Patent Application Ser. No. 61/561,616, filed Nov. 18, 2011; U.S. Provisional Patent Application Ser. No. 61/641,781, filed May 2, 2012; U.S. Non-Provisional patent application Ser. No. 13/411,321, filed Mar. 2, 2012; U.S. Provisional Patent Application Ser. No. 61/640,963, filed May 1, 2012; U.S. Provisional Patent Application No. 61/764,395, filed Feb. 13, 2013; U.S. Non-Provisional patent application Ser. No. 13/558,191, filed Jul. 25, 2012; U.S. Provisional Patent Application Ser. No. 61/692,619, filed Aug. 23, 2012; U.S. Provisional Patent Application Ser. No. 61/694,159, filed Aug. 28, 2012; U.S. Non-Provisional patent application Ser. No. 13/604,327, filed Sep. 5, 2012; U.S. Provisional Patent Application Ser. No. 61/723,675, filed Nov. 7, 2012; U.S. Non-Provisional patent application Ser. No. 13/679,687, filed Nov. 16, 2012; U.S. Provisional Patent Application Ser. No. 61/728,150, filed Nov. 19, 2012; U.S. Provisional Patent Application Ser. No. 61/764,395, filed Feb. 13, 2013; Provisional patent application Ser. No. 13/786,114, filed Mar. 5, 2013; U.S. Non-Provisional patent application Ser. No. 13/786,332, filed Mar. 5, 2013; U.S. Non-Provisional patent application Ser. No. 13/875,000, filed May 1, 2013; U.S. Provisional Patent Application No. 61/849,841, filed Jul. 24, 2013; U.S. Provisional patent application Ser. No. 13/973,696, filed Aug. 22, 2013; U.S. Provisional Patent Application No. 61/878,425, filed Sep. 16, 2013; U.S. Non-Provisional patent application Ser. No. 14/074,166, filed Nov. 7, 2013; U.S. Provisional Patent Application No. 61/905,699, filed Nov. 18, 2013; U.S. Provisional Patent Application No. 61/933,733, filed Jan. 30, 2014; U.S. Provisional Patent Application No. 62/057,419, filed Sep. 30, 2014, U.S. Provisional Patent Application No. 62/068,517, filed Oct. 24, 2014; U.S. Non-Provisional patent application Ser. No. 14/546,354 filed on Nov. 18, 2014; U.S. Provisional Patent Application No. 62/082,463, filed Nov. 20, 2014; U.S. Non-Provisional patent application Ser. No. 14/552,274 filed on Nov. 24, 2014; U.S. Non-Provisional patent application Ser. No. 14/557,275 filed on Dec. 1, 2014; PCT Application No. US2015/013512 filed on Jan. 29, 2015; U.S. Non-Provisional patent application Ser. No. 14/609,168 filed on Jan. 29, 2015 and U.S. Provisional Patent Application No. 62/137,666 filed on Mar. 24, 2015 are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A photocontrol apparatus to provide a control signal to a high-impedance controller input used to control a delivery of power to a load device, the photocontrol apparatus comprising:
   a resistor having a first node and a second node;
   a switch including a first node, a second node, and a third node, the first node electrically coupled to a line node of an alternating current (AC) power source and the third node electrically coupled to the first node of the resistor, wherein the second node of the resistor is an output node of the photocontrol that is electrically coupleable to the high-impedance controller input;

a first capacitor having a first node and a second node, the first node of the first capacitor electrically coupled to the first node of the switch and the second node of the first capacitor electrically coupled to the third node of the switch;

a direct current (DC) power supply circuit that includes:
a positive DC power supply node electrically coupled to the first node of the resistor;
a negative DC power supply node;
a second capacitor having a first node and a second node, the first node of the second capacitor electrically coupled to the positive DC power supply node and the second node of the second capacitor electrically coupled to the negative DC power supply node;
a zener diode having a cathode and an anode, the cathode of the zener diode electrically coupled to the positive DC power supply node and the anode of the zener diode electrically coupled to the negative DC power supply node; and
a diode having a cathode and an anode, the cathode of the diode electrically coupled to the second node of the resistor and the anode of the diode electrically coupled to the negative DC power supply node;

a comparator including a first power supply input node, a second power supply input node, a first input node, a second input node, and an output node, wherein the output node is communicably coupled to the second node of the switch and one of the first and the second power supply input nodes of the comparator is electrically coupled to the positive DC power supply node of the DC power supply circuit and the other of the first and the second power supply input nodes of the comparator is electrically coupled to the negative DC power supply node of the DC power supply circuit; and an ambient light sensor having an output node electrically coupled to one of the first input node or the second input node of the comparator, the ambient light sensor at least partially causes a voltage level of the one of the first input node or the second input node to which the ambient light sensor is electrically coupled to change in response to the ambient light sensor being at least partially illuminated with light.

2. The photocontrol apparatus of claim 1 wherein the switch is a depletion mode Metal Oxide Semiconductor Field Effect Transistor (MOSFET), the first node of the switch is a drain node of the MOSFET, the second node of the switch is a gate node of the MOSFET, and the third node of the switch is a source node of the MOSFET.

3. The photocontrol apparatus of claim 1, further comprising:
a transient voltage suppression diode having a cathode and an anode, the cathode of the transient voltage suppression diode electrically coupled to the first node of the switch and the anode of the transient voltage suppression diode electrically coupled to the third node of the switch.

4. The photocontrol apparatus of claim 1 wherein the first capacitor has a capacitance less than or equal to 0.1 microfarads.

5. The photocontrol apparatus of claim 1 wherein the ambient light sensor comprises at least one of a solar cell, a semiconductor photo diode, a cadmium sulfide (CDS) cell, or a semiconductor ambient light sensor.

6. The photocontrol apparatus of claim 1 wherein the resistor has a resistance of at least 200 kilohms.

7. The photocontrol apparatus of claim 1 wherein the ambient light sensor includes a ground reference node electrically coupled to the negative DC power supply node of the DC power supply circuit.

8. The photocontrol apparatus of claim 1, further comprising:
a third capacitor having a first node and a second node, the first node of the third capacitor electrically coupled to the output node of the ambient light sensor and the second node of the third capacitor electrically coupled to the negative DC power supply node of the DC power supply circuit.

9. The photocontrol apparatus of claim 1 wherein the resistor, the switch, the first capacitor, the second capacitor, the diode, the zener diode, and the comparator are surface mount devices.

10. The photocontrol apparatus of claim 1 wherein the first capacitor is a non-electrolytic capacitor.

11. The photocontrol apparatus of claim 1 wherein when the switch is in a first state and the ambient light sensor causes the voltage level of the one of the first input node or the second input node to which the output node of the ambient light sensor is electrically coupled to fall below a first threshold voltage level the comparator causes the switch to change to a second state, and when the switch is in the second state and the ambient light sensor causes the voltage level of the one of the first input node or the second input node to which the output node of the ambient light sensor is electrically coupled to rise above a second threshold voltage level the comparator causes the switch to change to the first state.

12. The photocontrol apparatus of claim 11 wherein the third node of the switch outputs a first control signal when the switch is in the first state, and the third node of the switch outputs a second control signal when the switch is in the second state.

13. The photocontrol apparatus of claim 1, further comprising:
a reference voltage source electrically coupled to the one of the first input node or the second input node to which the output node of the ambient light sensor is not electrically coupled.

14. The photocontrol apparatus of claim 13 wherein the reference voltage source at least one of a diode or a voltage divider that includes at least two resistors.

15. The photocontrol apparatus of claim 1 wherein the comparator is a comparator integrated circuit or an operational amplifier integrated circuit, or a comparator circuit composed of discrete components including a negative voltage supply node, a positive voltage supply node, a non-inverting input node, an inverting input node, and a voltage output node, and wherein the negative voltage supply node is the first power supply input node, the positive voltage supply node is the second power supply input node, the non-inverting input node is the first input node, the inverting input node is the second input node, and the voltage output node is the output node.

16. The photocontrol apparatus of claim 1, further comprising:
a housing at least partially enclosing the switch and the ambient light sensor, the housing including a translucent portion formed from at least one of polycarbonate or silicone.

17. A photocontrol apparatus to provide a control signal to a high-impedance controller input used to control a delivery of power to a load device, the photocontrol apparatus comprising:

a resistor having a first node and a second node;

a switch including a first node, a second node, and a third node, the first node electrically coupled to a line node of an alternating current (AC) power source and the third node electrically coupled to the first node of the resistor, wherein the second node of the resistor is an output node of the photocontrol that is electrically coupleable to the high-impedance controller input;

a first capacitor having a first node and a second node, the first node of the first capacitor electrically coupled to the first node of the switch and the second node of the first capacitor electrically coupled to the third node of the switch;

a direct current (DC) power supply circuit that includes:

a positive DC power supply node electrically coupled to the first node of the resistor;

a negative DC power supply node;

a second capacitor having a first node and a second node, the first node of the second capacitor electrically coupled to the positive DC power supply node and the second node of the second capacitor electrically coupled to the negative DC power supply node;

a voltage regulator having a first node and a second node, the first node of the voltage regulator electrically coupled to the positive DC power supply node and the second node of the voltage regulator electrically coupled to the negative DC power supply node; and a rectifier having a cathode and an anode, the cathode of the rectifier electrically coupled to the second node of the resistor and the anode of the rectifier electrically coupled to the negative DC power supply node; and a switch control circuit including a first power supply input node, a second power supply input node, a first input node, a second input node, and an output node, wherein the output node is communicably coupled to the second node of the switch, one of the first and the second power supply input nodes of the switch control circuit is electrically coupled to the positive DC power supply node of the DC power supply circuit and the other of the first and the second power supply input nodes of the switch control circuit is electrically coupled to the negative DC power supply node of the DC power supply circuit, and one of the first input node or the second input node of the switch control circuit is coupled to an output node of an ambient light sensor to receive a signal therefrom indicative of an ambient light level.

18. The photocontrol apparatus of claim 17 wherein the switch is a depletion mode Metal Oxide Semiconductor Field Effect Transistor (MOSFET), the first node of the switch is a drain node of the MOSFET, the second node of the switch is a gate node of the MOSFET, and the third node of the switch is a source node of the MOSFET.

19. The photocontrol apparatus of claim 17, further comprising:

a transient voltage suppression diode having a cathode and an anode, the cathode of the transient voltage suppression diode electrically coupled to the first node of the switch and the anode of the transient voltage suppression diode electrically coupled to the third node of the switch.

20. The photocontrol apparatus of claim 17 wherein the first capacitor has a capacitance less than or equal to 0.1 microfarads.

21. The photocontrol apparatus of claim 17 wherein the resistor has a resistance of at least 200 kilohms.

22. The photocontrol apparatus of claim 17, further comprising:

a third capacitor having a first node and a second node, the first node of the third capacitor electrically coupled to the output node of the ambient light sensor and the second node of the third capacitor electrically coupled to the negative DC power supply node of the DC power supply circuit.

23. The photocontrol apparatus of claim 17 wherein the resistor, the switch, the first capacitor, the second capacitor, the rectifier, the voltage regulator, and the switch control circuit are surface mount devices.

24. The photocontrol apparatus of claim 17 wherein the first capacitor is a non-electrolytic capacitor.

25. The photocontrol apparatus of claim 17, further comprising:

a reference voltage source electrically coupled to the one of the first input node or the second input node of the switch control circuit to which the output node of the ambient light sensor is not electrically coupled.

26. The photocontrol apparatus of claim 25 wherein the reference voltage source at least one of a diode or a voltage divider that includes at least two resistors.

27. The photocontrol apparatus of claim 17 wherein the switch control circuit comprises an operational amplifier including a negative voltage supply node, a positive voltage supply node, a non-inverting input node, an inverting input node, and a voltage output node, and wherein the negative voltage supply node is the first power supply input node, the positive voltage supply node is the second power supply input node, the non-inverting input node is the first input node, the inverting input node is the second input node, and the voltage output node is the output node.

28. The photocontrol apparatus of claim 17, further comprising:

a housing that at least partially encloses the switch, the housing including a translucent portion formed from at least one of polycarbonate or silicone.

* * * * *